United States Patent
Hsieh

(10) Patent No.: US 7,432,666 B2
(45) Date of Patent: Oct. 7, 2008

(54) COLD CATHODE FLUORESCENT LAMP DRIVING SYSTEM

(75) Inventor: Kuan-Hong Hsieh, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/985,762

(22) Filed: Nov. 16, 2007

(65) Prior Publication Data

US 2008/0067957 A1 Mar. 20, 2008

Related U.S. Application Data

(62) Division of application No. 11/117,278, filed on Apr. 28, 2005, now Pat. No. 7,321,205.

(51) Int. Cl.
*G05F 1/00* (2006.01)
(52) U.S. Cl. .................. 315/291; 315/307; 315/274; 315/224; 315/247
(58) Field of Classification Search .................. 315/291, 315/274, 307, 276–279, 297, 224, 225

See application file for complete search history.

(56) References Cited

U.S. PATENT DOCUMENTS

| 6,051,933 | A | * | 4/2000 | Aiello et al. ............ 315/209 R |
| 6,396,722 | B2 | | 5/2002 | Lin |
| 6,501,234 | B2 | | 12/2002 | Lin et al. |

* cited by examiner

*Primary Examiner*—Tuyet Vo
(74) *Attorney, Agent, or Firm*—Wei Te Chung

(57) ABSTRACT

A CCFL (cold-cathode fluorescent lamp) driving system for digitally driving at least one CCFL, according to embodiments of the present invention, generally includes a transformer, a sense circuit and a CCFL controller. Through the transformer, a DC voltage is supplied to the CCFL load. The sense circuit is provided to sense the current flowing through the CCFL load, and generate a corresponding feedback signal as an input to the CCFL controller. In accordance with embodiments, the CCFL controller is provided to receive a triangular waveform signal and a sinusoidal waveform signal, where the sinusoidal waveform signal has an amplitude regulated by the feedback signal and generate an output signal, corresponding to a comparison of said triangular waveform signal and the amplitude-regulated sinusoidal waveform signal, thus the output signal can be utilized to regulate the voltage delivered to the CCFL load.

10 Claims, 4 Drawing Sheets

COLD CATHODE FLUORESCENT LAMP DRIVING SYSTEM

CROSS REFERENCE TO RELATED APPLICATION

This is a divisional application of application Ser. No. 11/117,278 filed Apr. 28, 2005, now U.S. Pat. No. 7,321,205 which is being incorporated in its entirety herein by reference.

BACKGROUND OF THE INVENTION

1. Field of the Invention

The present invention relates to a driving system, and particularly to a cold cathode fluorescent lamp (CCFL) driving system that can be utilized to digitally drive a CCFL load included in the system.

2. General Background

Fluorescent lamps are typically used in a number of applications where light is required but power available to generate the light is limited. One such application is a backlighting for a notebook computer or a similar portable electronic device. One popular type of the fluorescent lamp is cold cathode fluorescent lamps (CCFLs), which are almost universally used in panels of various LCDs (liquid crystal displays). The CCFLs require a high starting voltage (on the order of 700-1,600 volts) for a short period of time, to ionize gas contained within the CCFL tubes and ignite the CCFLs. After the gas in the CCFLs is ionized and the CCFLs are lit, less voltage is needed to keep the CCFLs on.

A CCFL tube typically contains a gas, such as Argon, Xenon or the like, along with a small amount of Mercury. After an initial ignition stage and the formation of plasma, electrical current flows through the CCFL tube, which results in the generation of ultraviolet light. The ultraviolet light in turn irradiates a phosphoric material coated on the inner wall of the CCFL tube, resulting in the emission of visible light. This process is generally achieved by the application of a driving system that can be utilized to generate an AC voltage to drive the CCFL when a DC voltage is initially applied.

FIG. 3 shows a conventional CCFL driving system 10. The system 10 broadly includes a power source 12, a CCFL driving circuit 16, a controller 14, a feedback loop 18, and a CCFL load 11. The power source 12 supplies a DC voltage to the CCFL driving circuit 16 under the control of the controller 14, thus generating an AC voltage to the CCFL load 11 through the CCFL driving circuit 16. The CCFL driving circuit 16 is typically a self-oscillating DC to AC converter. Generally, the CCFL driving circuit 16 includes a transformer 161 having a primary winding and a secondary winding, a first and a second switches S1, S2, and a drive circuit 163. The power source 12 and the switches S1, S2 are coupled to the primary winding of the transformer 161. The drive circuit 163 is coupled to the first and second switches S1, S2 to alternately drive the first and second switches S1, S2 to conduct. Accordingly, two paths are defined by the first and second switches S1, S2, with the first switch S1 defining a first conducting path and the second switch S2 defining a second conducting path. The CCFL load 11 includes one or more lamps CCFL1, CCFL2, and is coupled to the secondary winding of the transformer 161 through a capacitor Co. The feedback loop 18 typically includes a sense resistor Rs, which provides a feedback (FB) signal indicative of the current flowing through the CCFL load 11 to the controller 14. The controller 14 typically includes a comparator 15 and a pulse width modulator 17 coupled in series. The comparator 15 is provided to receive a reference signal REF and the FB signal. The comparator 15 then produces a control signal CN corresponding to a comparison of the FB signal and the reference signal, to control the pulse width modulator 17. The pulse width modulator 17 generates a pulse width modulated signal, based at least on the control signal, to the drive circuit 163 to alternately control the first and second switches S1, S2 to conduct. Thus the power delivered to the CCFL load 11 is regulated, which will be discussed in detail below.

FIG. 4 provides a signal representation of the pulse width modulator 17. The pulse width modulator 17 generates a pulse width modulated (PWM) signal 36 typically set by an oscillator 22 and a variable selector 24. The variable selector 24 is provided to adjustably set a pulse width 'L' of the PWM signal 36, and thus permit an appropriate amount of power to be delivered to the CCFL load 11. The variable selector 24 varies the value of a DC signal 30, i.e. the power delivered to the CCFL load 11, and determines a desired dim setting by increasing or decreasing the DC signal 30. The oscillator 22 is provided to generate a triangular waveform 34 of predetermined frequency, as an input to the pulse width modulator 17. The DC signal 30 generated is superimposed upon the triangular waveform 34. As illustrated in FIG. 4, a section is defined by the intersections of the DC voltage 30 with each of the rises 25a and falls 25b of each triangular wave 34. The section determines the leading and falling edges of each pulse, and thereby the pulse width 'L' of the PWM signal 36. Thus a higher value of the DC signal 30 generates a smaller pulse width 'L', and a lower value of the DC signal 30 generates a larger pulse width 'L'. Alternatively, a section defined by each falling edge 25b and the next rising edge 25c is utilized to generate the pulse width 'L'. Therefore, the pulse width modulator 17 provided in the controller 14 is actuated to increase or decrease the DC signal 30 by the control signal CN. The PWM signal 36 thereby generated is applied to the drive circuit 163 to drive the first and second switches S1, S2 to alternately conduct, thus regulating power delivered to the CCFL load 11.

The system 10 described herein is generally composed of separate, large components, which occupy much valuable "real estate" on a supporting substrate such as a circuit board. Circuit designers generally require modern integrated circuits to be contained in very small packages. In addition, the separate, large components add to the complexity and cost of the overall design and manufacturing of the whole driving system. Furthermore, the system 10 is basically designed to provide a single operation/function with respect to the CCFL load 11. However, modern digital technology trends dictate that various kinds of circuits, including driving circuits, should not be limited to performing one or a handful of relatively precise and/or complex operations. Rather, the circuits should be able to perform a combination of operations when they are connected to a computer. For example, a plurality of CCFLs or a selected combination of CCFLs may be required to operate in a predetermined or controllable order during intermittent or particular periods, or continuously. To accomplish such processes, control by a computer is required. Yet the system 10 has a little capability to be compatible with a computer in order to accomplish such processes.

Other similar CCFL driving systems can be found in U.S. Pat. Nos. 6,501,234 and 6,396,722, and Taiwan Pat. Publication Nos. 423,204, 502,928 and 485,701. Each of these patents is incorporated herein by reference as disclosing a circuit of a type similar to that shown in FIG. 3. Each of the disclosed circuits may be subject to drawbacks similar and/or additional to the drawbacks detailed above in relation to the system 10 shown in FIG. 3.

What is needed, therefore, is a CCFL driving system that can be utilized to digitally drive a CCFL load.

What is also needed is a CCFL driving system partly integrated into a chipset in order to reduce manufacturing costs.

What is further needed is a CCFL driving system that includes a controller therein and permits the controller to be integrated within a chipset, thus providing a small overall package.

SUMMARY

The present CCFL driving system according to embodiments of the present invention generally includes a transformer, a sense circuit and a controller. The transformer includes a primary winding and a secondary winding, the primary winding being coupled to a voltage source, the secondary winding being coupled to a CCFL (cold-cathode fluorescent lamp) circuit. The sense circuit is provided to sense the current flowing through a selected CCFL or CCFLs of the CCFL circuit and thereby generate a feedback signal. The controller is provided to receive a sawtooth waveform signal and a sinusoidal waveform signal, wherein the sinusoidal waveform signal has an amplitude regulated at least by the feedback signal, and to generate an output signal corresponding to a comparison of the sawtooth waveform signal and the amplitude-regulated sinusoidal waveform signal, the output signal being provided for regulating the voltage source. In accordance with an exemplary embodiment, the controller is provided to generate an output signal representing a pulse signal, the pulse signal having a pulse width regulated by the feedback signal.

In addition, a CCFL controller according to embodiments of the present invention is shown. The CCFL controller generally includes a receiving means and a generating means. The receiving means is provided to receive a sinusoidal waveform signal and a sawtooth waveform signal. The generating means is provided to generate an output signal corresponding to a comparison of the sawtooth waveform signal and the amplitude-regulated sinusoidal waveform signal wherein the sinusoidal waveform signal has an amplitude regulated by a control signal, wherein the control signal may be associated with a load to be sensed. In accordance with an exemplary embodiment, the sawtooth waveform signal may be a triangular waveform signal with a predetermined frequency.

Other advantages and novel features of the present CCFL driving system will become more apparent from the following detailed description of the preferred embodiments when taken in conjunction with the accompanying drawings, in which:

DETAILED DESCRIPTION OF THE PREFERRED EMBODIMENTS

The CCFL driving system is adaptable for a plurality of cold cathode fluorescent lamps (CCFLs). The CCFLs are arranged, for example, in large panels for displays with a minimum of 6 lamps, although any other suitable arrangements for the CCFLs in various applications may be adopted. The following description is of a CCFL driving system with only one lamp, for purposes of illustration of preferred embodiments of the present invention. Of course, the present CCFL driving system is not to be limited by the number of loads, nor is it to be limited to the CCFL loads or any other type of loads.

Figure 1:
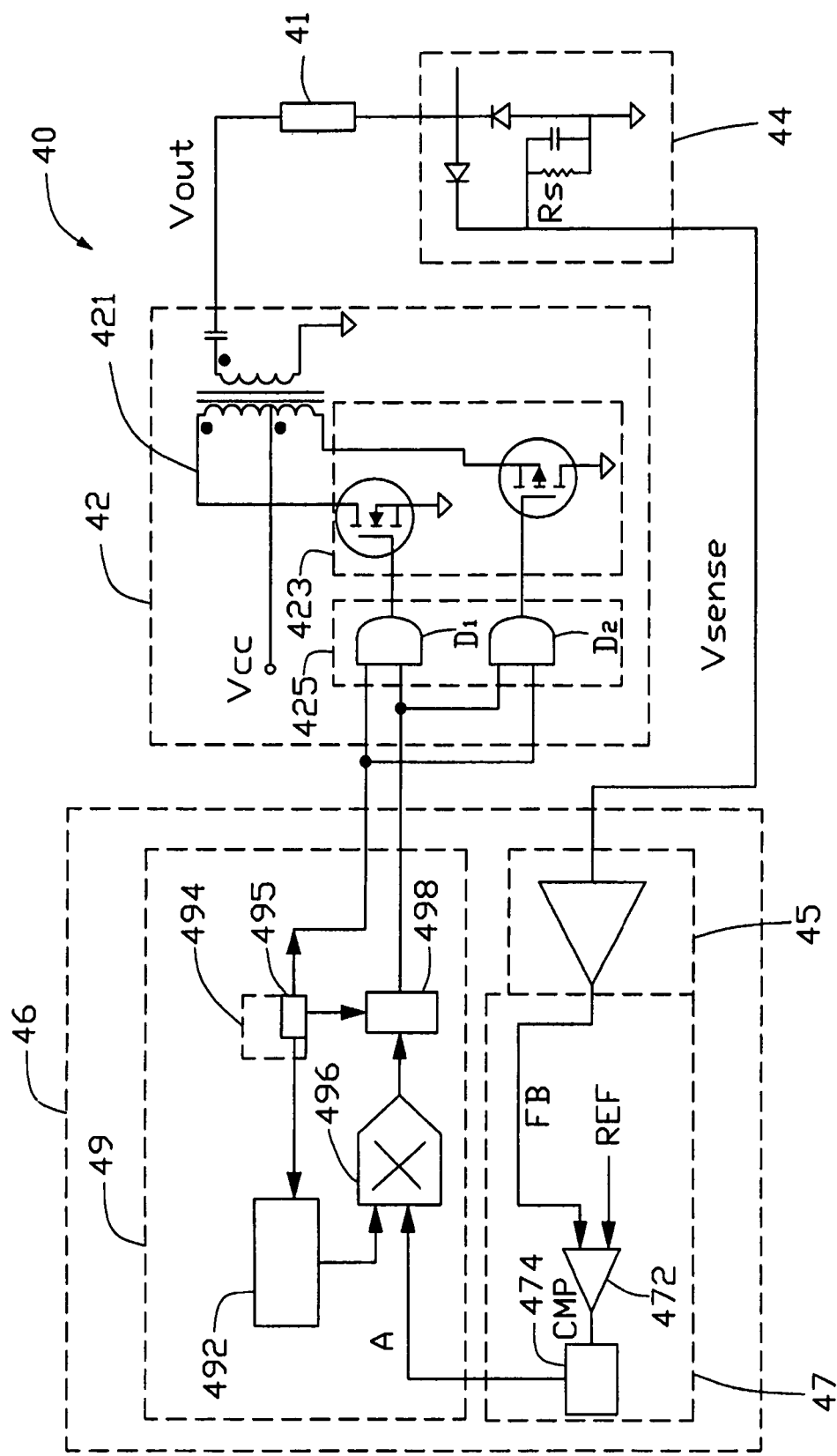
FIG. 1 is a circuit diagram of a CCFL driving system according to a preferred embodiment of the present invention.

Referring to FIG. 1, a circuit diagram of a CCFL driving system 40 according to a preferred embodiment of the present invention is shown. The CCFL driving system generally comprises a power supply circuit 42, a sense circuit 44, a feedback controller 46, and a CCFL 41. Each of these functional components will be described more below.

The power supply circuit 42 generally comprises a self-oscillating DC to AC converter, known as a Royer circuit. The self-oscillating DC to AC converter may be substituted with other suitable circuits that can be controlled by the controller 46 and arranged for providing an AC voltage Vout to the CCFL 41, when a DC voltage is supplied to the power supply circuit 42. In accordance with a preferred embodiment of the present invention, the power supply circuit 42 comprises a transformer unit 421, a plurality of switches 423 (only two shown), and a drive circuit 425. The switches 423 can be Metal-Oxide-Semiconductor Field-Effect-Transistors (MOSFETs), Bipolar Junction Transistors (BJTs), or combinations of MOSFETs and BJTs. The drive circuit 425 includes a plurality of drives (only a D1_Drive and a D2_Drive are shown) coupled to the switches 423 respectively. The drives may be converters, each of which selectively controls the conduction state of the switches 423. The transformer unit 421 includes a transformer comprising a primary winding and a secondary winding thereof. The primary winding is coupled to a voltage source Vcc and the switches 423, and the secondary winding is connected to the CCFL 41. According to other embodiments of the present invention, transformers with a plurality of primary windings and secondary windings may also be adopted when needed. It should be noted that transformer unit 421, the switches 423 and the drive circuit 425 included in the power supply circuit 42 can be suitably set and arranged according to the requirements of various particular applications.

The sense circuit 44 typically comprises a sense impedance, such as a sense resistor Rs shown in FIG. 1 or a capacitor (not shown). In this embodiment, the sense resistor Rs is connected to the CCFL 41 to produce a voltage drop Vsense in response to the current flowing through the CCFL 41. The voltage drop Vsense sensed by the sense resistor Rs is applied as a feedback signal to the controller 46.

Using the feedback signal from the sense resistor Rs, the controller 46 regulates an amount of voltage and power delivered to the primary winding of the transformer unit 421, which in turn regulates an amount of power delivered to the CCFL 41. The controller 46 will be described more fully as follows.

The controller 46 can comprise any suitable circuit configuration for regulating the voltage source Vcc delivered to the CCFL 41 based at least in part on the feedback signal from the sense circuit 44. In accordance with an embodiment of the present invention, the controller 46 comprises a signal converting circuit 45, a control signal generator 47, and a pulse signal generator 49. It should be noted that, in accordance with embodiments of the present invention, the whole controller 46 is integrated into one chipset for cost and size reasons. Alternatively, the controller 46 can be comprised of separate components, with one or more selected components being integrated into the chipset for other applications, as long as the whole controller 46 works in the same way as that described below. Through the integration of the controller 46, the CCFL driving system 40 can be configured as a small package, and thus benefit from lower manufacturing costs compared with the conventional CCFL driving system.

The signal converting circuit 45 can comprise any suitable converter circuit configuration for converting a signal from an analog value into a digital value. In accordance with an exemplary embodiment, the signal converting circuit 45 comprises a converter, for example, such as an A/D (analog-to-digital) converter, for receiving the voltage drop Vsense derived from the sense resistor Rs, and further converting the analog voltage drop Vsense to a digital feed back (FB) signal that is input into the digital control signal generator 47.

The control signal generator 47 can generally comprise any suitable control signal generating circuit for generating a control signal, according to the comparison of the digital feed back signal FB and a reference signal REF. In accordance with an exemplary embodiment, the control signal generator 47 generally comprises a comparator 472 and a control unit 474. The comparator 472 is provided to compare the digital feed back signal FB with the reference signal REF, and generates a control signal CMP based on the difference thereof. The reference signal REF is a predetermined constant reference voltage, for example, representing the operational current drawn for the load of the CCFL 41. However, in other embodiments, the reference signal REF can be any other suitable voltage according to the particular application desired. The reference signal REF may be internally generated within the controller 46, or may be provided by one or more external circuits coupled to the system 40. In addition, if a protection circuit (not shown) is applied in the system 40, another reference signal REF, for example, indicative of the allowable current flowing through the CCFL 41 or/and the voltage associated therewith, can be provided within the system 40.

The control unit 474 is provided to generate a digital signal representing a modulated value based partly on the control signal CMP. In accordance with an exemplary embodiment, the modulated value is utilized to regulate a pulse width of a pulse signal generated by the pulse signal generator 49, which will be discussed in greater detail below. In an embodiment of the present invention, if the digital feed back signal FB is less than the reference signal REF, a modulated value 1/A (not shown) is generated at the output of the control unit 474, and further input to the pulse signal generator 49. Conversely, if the digital feed back signal FB is greater than the reference signal REF, another modulated value A, such as that shown in FIG. 1, is generated at the output of the control unit 474, and then input to the pulse signal generator 49. Otherwise, if the digital feed back signal FB is equal to the reference signal REF, the control signal CMP produced by the comparator 472 remains constant and maintains the digital feed back signal FB at the reference signal REF.

The pulse signal generator 49 described herein generally comprises a sinusoidal waveform generator 492, a sawtooth waveform generator 494, a multiplier 496, and a modulator 498.

The sinusoidal waveform generator 492 is provided to generate a first sinusoidal waveform which is input to the multiplier 496. Assuming the same parameters as described above are applied, the multiplier 496 is provided to receive the modulated value A and the first sinusoidal waveform at the input thereof, and output a second sinusoidal waveform which is A times as great as the first sinusoidal waveform in amplitude. That is, if a modulated value A and a first sinusoidal waveform, expressed as SinQ, are received, the multiplier 496 generates a corresponding second sinusoidal waveform, expressed as A*sinQ. Likewise, if another modulated value 1/A and the first sinusoidal waveform SinQ are received, the multiplier 496 generates another corresponding second sinusoidal waveform 1/A*sin Q. It should be noted herein that the multiplier 496 can be any suitable circuit configuration for regulating the modulated value based at least in part on the digital feedback signal FB.

The sawtooth waveform generator 494 is applied to generate a sawtooth waveform, such as a triangular waveform Vm with a predetermined frequency. Of course, in other particular applications, the sawtooth waveform generator 494 can generate any other sawtooth waveform with a suitable frequency. Herein, a sawtooth waveform refers to any ramp signal waveform for the purposes of illustration of embodiments of the invention. In an exemplary embodiment of the present invention, the sawtooth waveform generator 494 preferably includes a clock generator 495 for generating a square wave pulse, and an integrator circuit (not shown) coupled in series to the clock generator 495. Through the integrator circuit, the square wave pulse can be integrated and formed as a triangular waveform. Alternatively, in other embodiments, the sawtooth waveform generator 494 may include a capacitor (not shown) having an appropriate time constant to create the triangular waveform. Furthermore, according to another embodiment of the present invention, the first sinusoidal waveform can be simultaneously formed by the clock generator 495, rather than by the additional sinusoidal waveform generator 492. Additionally, the clock generator 495 may be utilized to control the drive circuit 425 to permit each of the switches 423 to be controllably conducted.

The modulator 498 generally comprises a comparator (not shown) coupled to the sawtooth waveform generator 494 and the multiplier 496. The comparator is provided to compare the second sinusoidal waveform with the triangular waveform, and generate a pulse signal having a pulse width regulated by the sawtooth waveform generator 494 and the multiplier 496. The pulse signal, with its pulse width being regulated, is then fed into the power supply circuit 42 to determine the power delivered to the CCFL 41. Thus, through the regulation of the pulse signal by the modulator 498, the controller 46 described herein is provided to enable an appropriate power from the supply power 42 to be delivered to the CCFL 41.

Figure 2A:
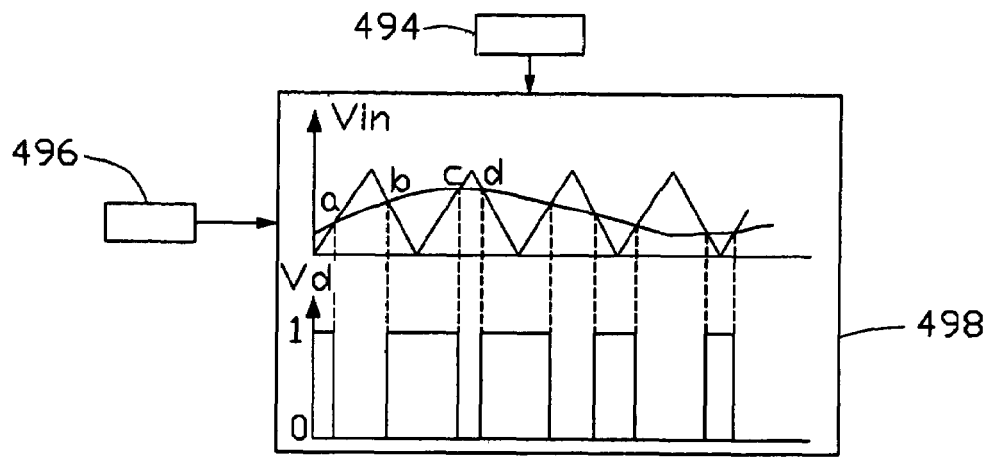
FIGS. 2A-C are essentially graphs of signal representations of a pulse width modulator of the CCFL driving system according to the preferred embodiment of the present invention.
Figure 2B:
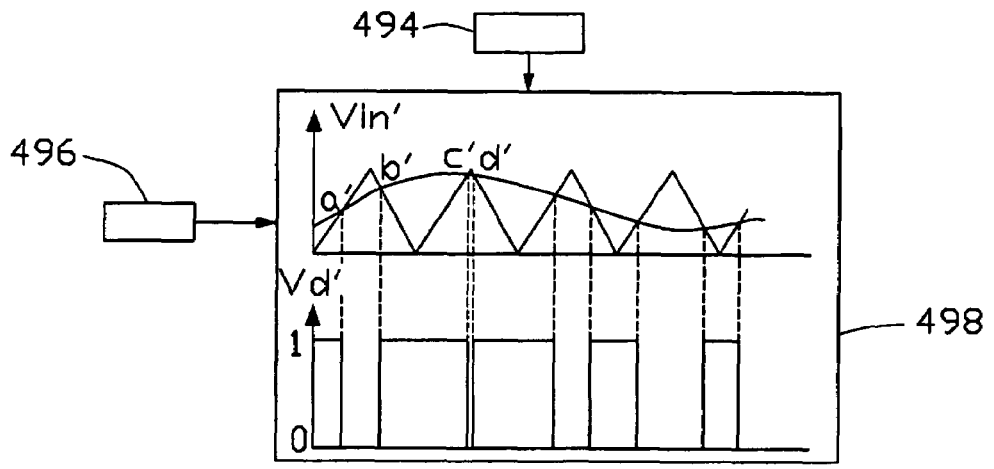
Figure 2C:
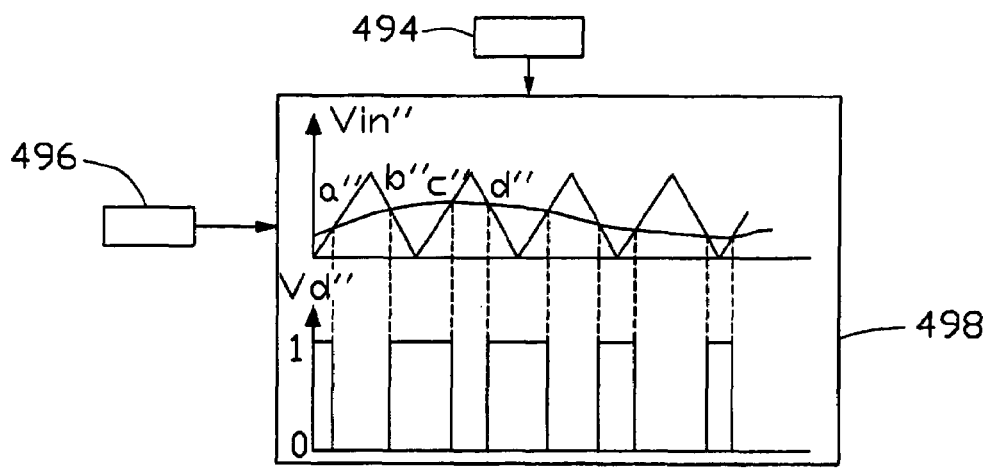
Figure 3:
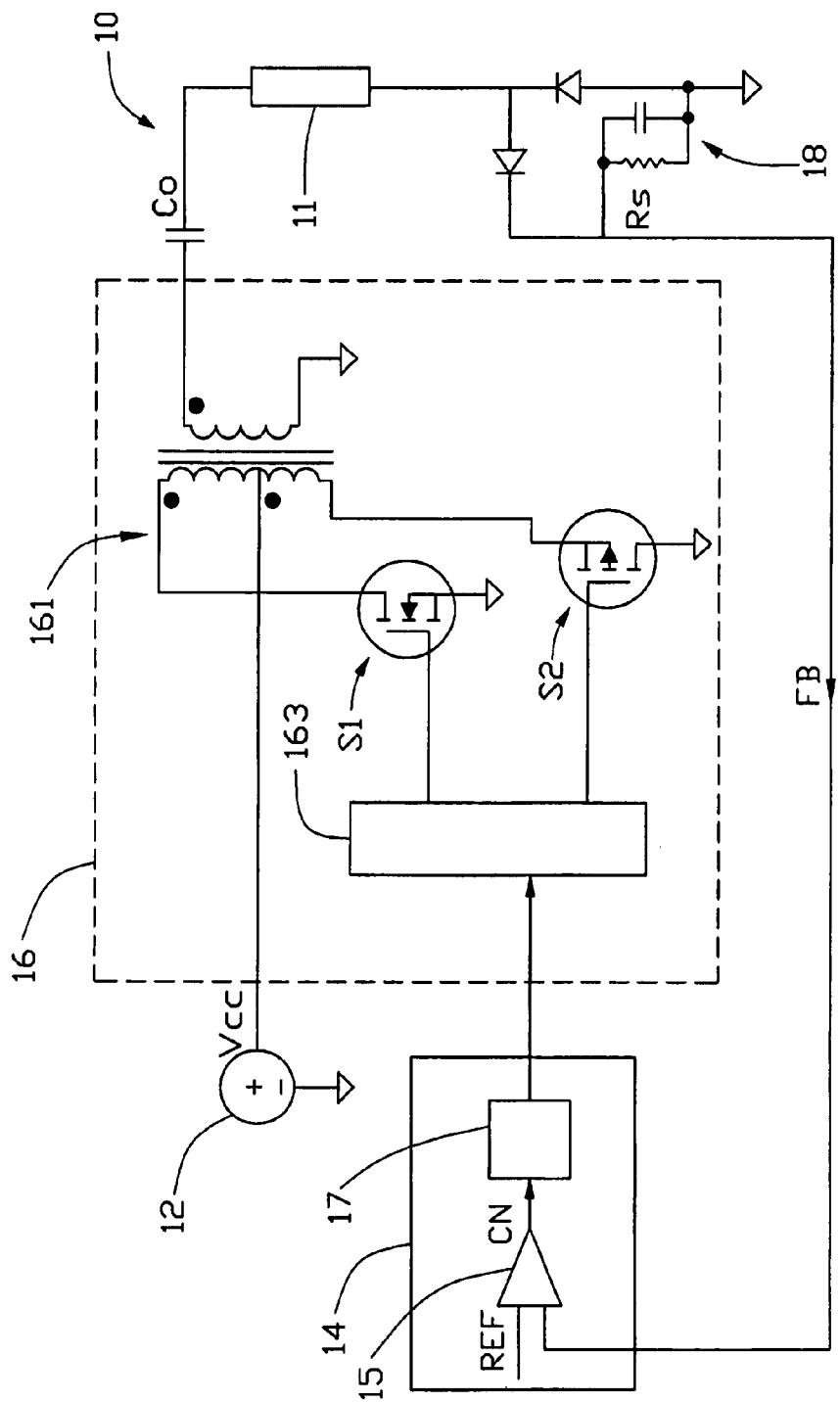
FIG. 3 is typically a circuit diagram of a conventional CCFL driving system of the prior art.
Figure 4:
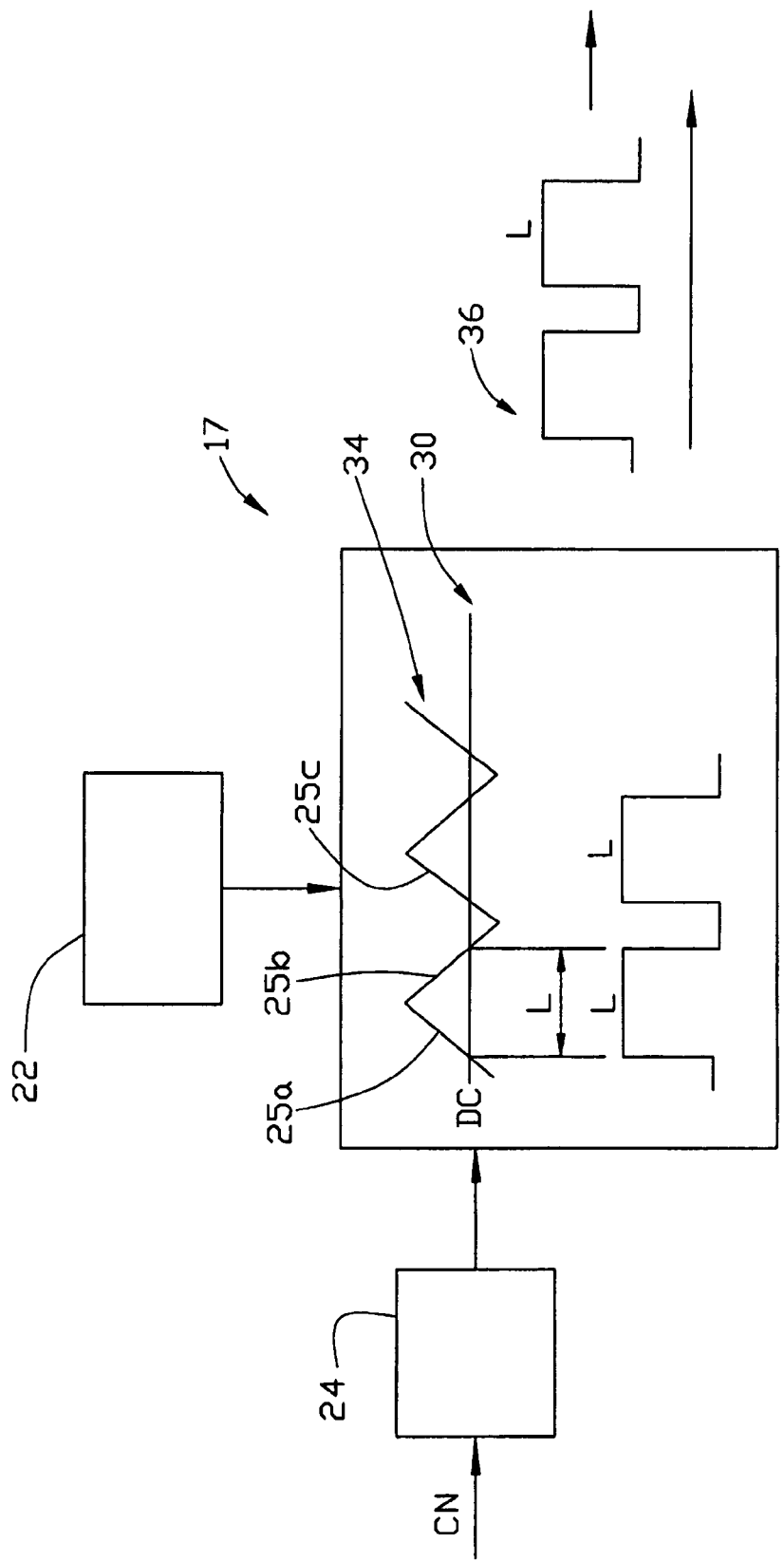
FIG. 4 is essentially a graph of signal representations of a pulse width modulator of the conventional CCFL driving system of the prior art.

FIGS. 2A-C are essentially graphs of signal representations of the modulator 498, in accordance with embodiments of the present invention. Referring to FIG. 2A, in this embodiment, the sawtooth waveform generator 494 generates a triangular waveform Vm with a predetermined frequency as an input to the modulator 498. A second sinusoidal waveform Vin derived from the multiplier 496 is superimposed upon the triangular waveform Vm. The two waveforms intersect at a series of points a, b, c, d, etc. According to the present example, if the second sinusoidal waveform Vin exceeds the triangular waveform Vm, a logic state "1" is generated. Otherwise, a logic state "0" is generated. As a result, a first pulse signal recorded by combinations of the logic states "0" and "1" is generated.

Referring to FIG. 2B, when the second sinusoidal waveform Vin' is increased in amplitude by the multiplier 496, the above-stated two waveforms intersect at another series of points a', b', c', d', etc, in similar fashion to what is seen in FIG. 2A. Consequently, a second pulse signal so generated has a greater pulse width than that of the first pulse signal.

Referring to FIG. 2C, the second sinusoidal waveform Vin" is decreased in amplitude by the multiplier 496 compared to what is seen in FIG. 2A. Accordingly, a third pulse signal being generated has a narrower pulse width than that of the first pulse signal. Thus, by changing the pulse width of the pulse signals, an appropriate power delivered to the CCFL 41 is achieved. It should also be noted that in addition to changing the pulse width of the pulse signals as described herein, other characteristic parameters of the pulse signals, such as distribution rates etc, can be also regulated through various combinations of the triangular waveform Vm and the second sinusoidal waveform Vin, in order to permit an appropriate power to be delivered to the CCFL 41. Either or both of the triangular waveform Vm and the second sinusoidal waveform Vin may be changed to this end.

Since the pulse signals so generated can be recorded in binary using "0" and "1" (also known as digital signals), the present CCFL driving system 40 is provided to enable one or more relatively precise and/or complex operations or a combination thereof to be employed with respect to a selected one or more of the CCFL circuits, when the CCFL driving system 40 is connected to a computer system for intermittent or continuous processes. In other words, the CCFL driving system 40 can be suitably controlled by the computer system. Furthermore, the CCFL driving system 40 is comprised in a smaller package compared with the conventional driving system, due to the integration of the controller 46 included in the CCFL driving system 40. Thus manufacturing costs of the CCFL driving system 40 are significantly reduced.

It is understood that the above-described embodiments are intended to illustrate rather than limit the invention. Variations may be made to the embodiments without departing from the spirit of the invention as claimed. The above embodiments illustrate the scope of the invention but do not restrict the scope of the invention.

What is claimed is:

1. A cold-cathode fluorescent lamp (CCFL) driving system comprising:
    a transformer comprising a primary winding and a secondary winding, said primary winding being coupled to a voltage source, said secondary winding being coupled to a CCFL load;
    a sense circuit for sensing a current flowing through said CCFL load and providing a corresponding feedback signal; and
    a controller coupled between said primary winding and said secondary winding for receiving two periodic wave signals having a non-zero amplitude of vibration respectively and providing an output signal corresponding to a comparison of said two periodic wave signals, wherein one of said two periodic wave signals have the amplitude thereof regulated at least partly by said feedback signal, and said output signal being provided for regulating a voltage of said voltage source delivered to said CCFL load.

2. The CCFL driving system as claimed in claim 1, wherein said one of said two periodic wave signals is a sinusoidal waveform signal, the other of said two periodic wave signals is a sawtooth waveform signal, and said output signal is a pulse-width modulation (PWM) waveform signal.

3. The CCFL driving system as claimed in claim 2, wherein said PWM waveform signal has a pulse width being regulated at least partly by said feedback signal.

4. The CCFL driving system as claimed in claim 2, wherein said sawtooth waveform signal is a triangular waveform signal with a predetermined frequency.

5. The CCFL driving system as claimed in claim 2, wherein said controller further comprises:
    a sinusoidal waveform signal generator for generating said sinusoidal waveform signal; and
    a sawtooth waveform signal generator for generating said sawtooth waveform signal.

6. The CCFL driving system as claimed in claim 2, further comprising a control signal generator for generating a control signal by comparing said feedback signal to a reference signal, said control signal being provided as an input to said controller to regulate the amplitude of said sinusoidal waveform signal.

7. The CCFL driving system as claimed in claim 6, wherein said control signal generator comprises a comparator for comparison of said feedback signal and said reference signal.

8. The CCFL driving system as claimed in claim 7, further comprising an A/D (analog-to-digital) converter for converting said feedback signal to a digital form and providing said digital form feedback signal to said control signal generator.

9. The CCFL driving system as claimed in claim 7, further comprising a regulating means for regulating the amplitude of said sinusoidal waveform signal by said control signal.

10. The CCFL driving system as claimed in claim 9, wherein the regulating means comprising a multiplier for receiving said control signal and said sinusoidal waveform signal and for outputting said sinusoidal waveform signal with the amplitude thereof being regulated by said control signal.

* * * * *